ial patent image US010165341B2

(12) United States Patent
Chang

(10) Patent No.: US 10,165,341 B2
(45) Date of Patent: Dec. 25, 2018

(54) METHOD OF IDENTIFYING LONG-SHINING ROGUE ONU IN PASSIVE OPTICAL NETWORK

(71) Applicant: Alcatel Lucent, Boulogne-Billancourt (FR)

(72) Inventor: Qingjiang Chang, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/030,139

(22) PCT Filed: Oct. 31, 2014

(86) PCT No.: PCT/IB2014/002730
§ 371 (c)(1),
(2) Date: Apr. 18, 2016

(87) PCT Pub. No.: WO2015/075544
PCT Pub. Date: May 28, 2015

(65) Prior Publication Data
US 2016/0269811 A1    Sep. 15, 2016

(30) Foreign Application Priority Data
Nov. 21, 2013   (CN) .......................... 2013 1 0590984

(51) Int. Cl.
*H04B 10/08*      (2006.01)
*H04B 17/00*      (2015.01)
(Continued)

(52) U.S. Cl.
CPC ...... *H04Q 11/0067* (2013.01); *H04J 14/0239* (2013.01); *H04J 14/08* (2013.01);
(Continued)

(58) Field of Classification Search
CPC ....... H04Q 11/0067; H04Q 2011/0079; H04Q 2011/0083; H04Q 2011/0096;
(Continued)

(56) References Cited

U.S. PATENT DOCUMENTS 7,386,234 B2 *   6/2008  Lee ........................ H04B 17/21
                                                            398/16
8,064,764 B2 *  11/2011  O'Byrne ............ H04B 10/0793
                                                            398/15

(Continued)

FOREIGN PATENT DOCUMENTS

CN        101005317 A       7/2007
CN        101340734 A       1/2009
(Continued)

OTHER PUBLICATIONS

"Rogue optical network unit (ONU) considerations; G.Sup49 (Feb. 2011)", ITU-T Standard, International Telecommunication Union, Geneva; CH, No. G.Sup49 (Feb. 2011), Feb. 25, 2011, pp. 16, XP017467827.
(Continued)

*Primary Examiner* — Ken N Vanderpuye
*Assistant Examiner* — Abbas H Alagheband
(74) *Attorney, Agent, or Firm* — Harness, Dickey & Pierce, P.L.C.

(57) ABSTRACT

The invention discloses a method, in an OLT in a passive optical network, of identifying a long-shining rogue ONU, the method comprising the steps of: A. allocating a specific radio frequency signal at a different frequency to each of ONUs in the passive optical network; and B. when the long-shining rogue ONU is detected in the passive optical network: b1. broadcasting a control message to each of the ONUs; b2. receiving uplink signals in the uplink; b3. recovering the specific radio frequency signals transmitted
(Continued)

by the normal ONUs from the uplink signals; and b4. identifying an absent specific radio frequency signal according to the recovered specific radio frequency signals, wherein the ONU corresponding to the absent specific radio frequency signal is the long-shining rogue ONU. The invention further discloses an OLT device performing the method and a method, in an ONU, of assisting the OLT in identifying a long-shining rogue ONU.

12 Claims, 4 Drawing Sheets

(51) Int. Cl.
  *H04Q 11/00* (2006.01)
  *H04J 14/02* (2006.01)
  *H04J 14/08* (2006.01)
(52) U.S. Cl.
  CPC ......... *H04J 2203/0062* (2013.01); *H04Q 2011/0079* (2013.01); *H04Q 2011/0083* (2013.01); *H04Q 2011/0096* (2013.01)
(58) Field of Classification Search
  CPC ......... H04J 14/0239; H04J 14/08; H04J 2203/0062; H04J 14/0265; H04J 14/0282; H04J 14/0298; H04J 14/0246; H04J 14/025; H04J 3/0682; H04J 3/1694; H04J 14/0247; H04J 14/0252; H04B 10/25754; H04B 10/2587; H04B 10/0793
  USPC .................... 398/23, 25, 71–72, 79
  See application file for complete search history.

(56) References Cited

U.S. PATENT DOCUMENTS

| | | | | |
|---|---|---|---|---|
| 2004/0156635 | A1* | 8/2004 | Felske | H04B 10/0779 398/66 |
| 2006/0051088 | A1* | 3/2006 | Lee | H04B 17/21 398/31 |
| 2006/0291870 | A1* | 12/2006 | Wan | H04B 10/505 398/183 |
| 2007/0264016 | A1* | 11/2007 | DeLew | H04J 3/0682 398/71 |
| 2008/0138064 | A1* | 6/2008 | O'Byrne | H04B 10/0793 398/25 |
| 2008/0310843 | A1* | 12/2008 | Gadkari | H04J 14/0226 398/72 |
| 2009/0010650 | A1* | 1/2009 | Tsuchiya | H04J 3/0602 398/59 |
| 2009/0232495 | A1* | 9/2009 | Shi | H04L 12/2861 398/43 |
| 2010/0028002 | A1* | 2/2010 | Qian | H04J 14/0227 398/79 |
| 2010/0142955 | A1* | 6/2010 | Yu | H04B 10/25754 398/72 |
| 2010/0316380 | A1* | 12/2010 | de Lind van Wijngaarden | H04Q 11/0066 398/58 |
| 2011/0194854 | A1* | 8/2011 | Freire | H04J 3/1694 398/58 |
| 2011/0255862 | A1* | 10/2011 | Riggsby | H04B 10/25751 398/25 |
| 2012/0008940 | A1* | 1/2012 | de Lind van Wijngaarden | H04Q 11/0066 398/26 |
| 2013/0051403 | A1* | 2/2013 | Sisto | H04L 12/5695 370/458 |

FOREIGN PATENT DOCUMENTS

| | | | | |
|---|---|---|---|---|
| CN | 101755410 A | 6/2010 | | |
| CN | 101841738 A | 9/2010 | | |
| CN | 102142897 A | 8/2011 | | |
| CN | 103036612 A | 4/2013 | | |
| EP | 2053763 A1 * | 4/2009 | ......... | H04B 10/0773 |
| WO | WO 2011104483 A1 * | 9/2011 | ......... | H01F 27/2847 |
| WO | WO-2011104483 A1 | 9/2011 | | |

OTHER PUBLICATIONS

International Search Report PCT/ISA/210 for International Application No. PCT/IB2014/002730 dated Mar. 25, 2015.

* cited by examiner

//<br>
METHOD OF IDENTIFYING LONG-SHINING ROGUE ONU IN PASSIVE OPTICAL NETWORK

CROSS-REFERENCE TO RELATED APPLICATIONS

This is a National Phase of PCT Patent Application No. PCT/IB2014/002730 filed on Oct. 31, 2014, and claims priority to, European Application No. 201310590984.9, filed Nov. 21, 2013, the contents of each of which are hereby incorporated by reference in their entirety.

FIELD OF THE INVENTION

The present disclosure generally relates to the field of optical communications and particularly to a method of and apparatus for identifying a long-shining rogue ONU by an OLT in a passive optical network and a method, in an ONU in a passive optical network, of assisting an OLT in identifying a long-shining rogue ONU.

BACKGROUND OF THE INVENTION

In a TDM/TWDM-PON system, a rogue Optical Network Unit (ONU) refers to the behavior that the ONU does not turn on or turn off a laser in a time slot allocated by an uplink bandwidth or it transmits an uplink signal in a wrong time slot and thereby hinders normal uplink transmission of other ONUs. Among all kinds of rogue behaviors, the long-shining rogue is the most troublesome. A long-shining rogue ONU always keeps its laser in an operating state and transmits a random signal, an idle signal or other unexpected signals all the time. As illustrated in FIG. 1, the long-shining rogue ONU occupies upload time slots allocated to other normal ONUs and thus results in crashing with other uplink signals. Therefore the long-shining rogue ONU can cause all the other well-operating ONUs to fail to transmit the uplink signals and thus may impose a serious impact on the operation of the network.

Currently, to identify a long-shining rogue ONU, a possible solution is to turn off optical transmitter modules of ONUs in the system one by one based on a control command from an Optical Line Terminal (OLT). With this one-by-one detection method, the OLT can finally identify which of the ONUs is a long-shining rogue ONU.

However, since the long-shining rogue ONU is mainly caused by an MAC error or a transceiver failure, the above one by one detection method can not identify a long-shining rogue ONU in the following conditions:

1) A long-shining rogue ONU can not respond to a control message of the OLT and refuses to shut down its optical transmitter.

2) A long-shining rogue ONU can respond to a control message of the LT but can not perform the control command to shut down its transmitter due to hardware malfunction or other failures.

In these cases, it is necessary to identify a long-shining rogue ONU manually, which may result in a huge maintenance cost. Therefore, it is vital for a network operator to identify which of the ONUs is a long-shining rogue ONU when the PON system fails. Especially in a practical implementation, there has been no effective solution to remotely and automatically identifying a long-shining rogue ONU which does not respond.

SUMMARY OF THE INVENTION

In order to address the technical problem above, the invention proposes a cost-effective solution to rapidly identifying a long-shining rogue ONU in a TDM/TDWM-PON system.

According to an aspect of the invention, there is disclosed a method, in an OLT in a passive optical network, of identifying a long-shining rogue ONU, the method including the steps of: A. allocating a specific radio frequency signal at a different frequency to each of ONUs in the passive optical network; and B. when the long-shining rogue ONU is detected in the passive optical network, which transmits noise or a random signal so that uplink signals of normal ONUs can not be received normally: b1. broadcasting a control message to each of the ONUs, wherein the control message instructs each of the ONUs to transmit the specific radio frequency signal in the uplink; b2. receiving uplink signals in the uplink; b3. recovering the specific radio frequency signals transmitted by the normal ONUs from the uplink signals; and b4. identifying an absent specific radio frequency signal according to the recovered specific radio frequency signals, wherein an ONU corresponding to the absent specific radio frequency signal is the long-shining rogue ONU.

Particularly the step b3 particularly includes: performing Fourier transformation on the received uplink signals to thereby recover the specific radio frequency signals transmitted by the normal ONUs from the uplink signals.

Particularly the uplink signals include the noise or the random signal transmitted by the long-shining rogue ONU and the specific radio frequency signals transmitted by the normal ONUs.

Particularly the specific radio frequency signals are low-frequency signals.

Particularly the specific radio frequency signals can be encoded and inserted into an uplink data frame.

According to another aspect of the invention, there is disclosed a method, in an ONU in a passive optical network, of assisting an OLT in identifying a long-shining rogue ONU, the method including the steps of: providing the ONU with a specific radio frequency signal, wherein frequency of a specific radio frequency signal of each of ONUs in the passive optical network is different from one another; and when a control message broadcasted by the OLT to instruct each of the ONUs to transmit the specific radio frequency signal in the uplink is received: temporarily stopping an uplink data signal from being transmitted to the OLT in the uplink; and transmitting the specific radio frequency signal to the OLT in the uplink.

Particularly the specific radio frequency signal is a low-frequency signal.

Particularly the method further includes the steps of: encoding the specific radio frequency signal and inserting the encoded specific radio frequency signal into an uplink data frame for transmission to the OLT.

According to another aspect of the invention, there is disclosed an OLT apparatus for identifying a long-shining rogue ONU in a passive optical network, the OLT apparatus comprising: a transmitting module configured to transmit downlink signals to ONUs in the passive optical network; a receiving module configured to receive uplink signals from the ONUs in the passive optical network; a decoding module configured to recover specific radio frequency signals transmitted by normal ONUs from the uplink signals, wherein frequency of the specific radio frequency signal of each of the ONUs in the passive optical network is different from one another; and a processing module configured to identify an absent specific radio frequency signal according to the specific radio frequency signals recovered by the decoding module, wherein an ONU corresponding to the absent specific radio frequency signal is the long-shining rogue ONU.

Particularly when the long-shining rogue ONU is detected in the passive optical network, which transmits noise or a random signal so that the uplink signals of the normal ONUs can not be received normally: the transmitting modules broadcasts a control message to each of the ONUs, wherein the control message instructs each of the ONUs to transmit the specific radio frequency signal in the uplink; the receiving module receives the uplink signals in the uplink, wherein the uplink signals include the noise or the random signal transmitted by the long-shining rogue ONU and the specific radio frequency signals transmitted by the normal ONUs; the decoding module recovers the specific radio frequency signals transmitted by the normal ONUs from the uplink signals; and the processing module identifies the absent specific radio frequency signal according to the specific radio frequency signals recovered by the decoding module, wherein the ONU corresponding to the absent specific radio frequency signal is the long-shining rogue ONU.

Particularly the decoding module performs Fourier transformation on the received uplink signals to thereby recover the specific radio frequency signals transmitted by the normal ONUs from the uplink signals.

Particularly the specific radio frequency signals are low-frequency signals.

Particularly the specific radio frequency signals can be encoded and inserted into an uplink data frame.

The invention is advantageous in that firstly a long-shining rogue ONU can be identified rapidly even if the long-shining rogue ONU can not turn off its own optical transmitter; secondly there is a low hardware cost because no extra element is required in the ONU and only an additional decoder is required in the OLT, thus saving an unnecessary hardware overhead; thirdly there is a low operation and maintenance cost because this solution can identify remotely and automatically a long-shining rogue ONU and thus greatly lower the operation and maintenance cost; and fourthly this solution can identify a long-shining rogue ONU in operation and thus will not turn off the optical transmitter of the normally operating ONU as compared with the prior art.

With these advantages, the suggested solution is an appealing solution to identifying a long-shining rogue ONU in a TDM/TWDM-PON system.

BRIEF DESCRIPTION OF DRAWINGS

The foregoing and other features of the invention will become more apparent from the following detailed description of embodiments illustrated in connection with the drawings and identical or like reference numerals in the drawings denote identical or like steps. In the drawings.

DETAILED DESCRIPTION OF EMBODIMENTS

Figure 1:
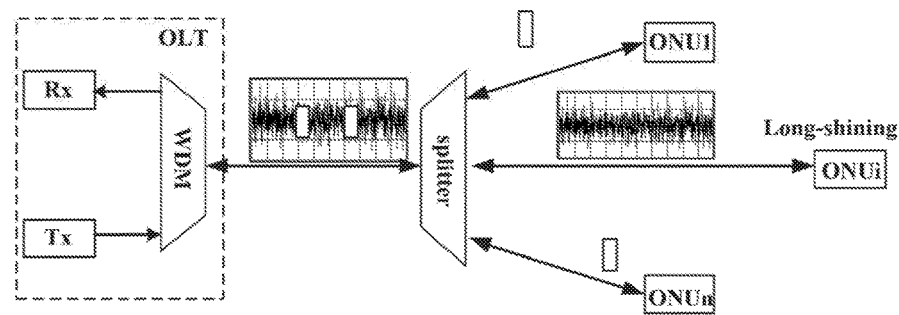
FIG. 1 illustrates a schematic diagram of the behavior of a long-shining rogue ONU in a PON system.

The following particular description of preferred embodiments of the invention will refer to the drawings which constitute a part of the invention. Particular embodiments in which the invention can be embodied are illustrated in the drawings by way of examples. The exemplary embodiments are not intended to exhaust all the embodiments of the invention. It shall be noted that although steps of methods according to the invention are described in a specific order, they are not intended to require or suggest that these operations be performed in the specific order or all the illustrated operations be performed for a desirable result, but on the contrary, the steps described in this context can be performed in a variable order. Additionally or alternatively, some of the steps can be omitted, and a plurality of steps can be combined into a step to be performed and/or a step can be decomposed into a plurality of steps to be performed.

Figure 2:
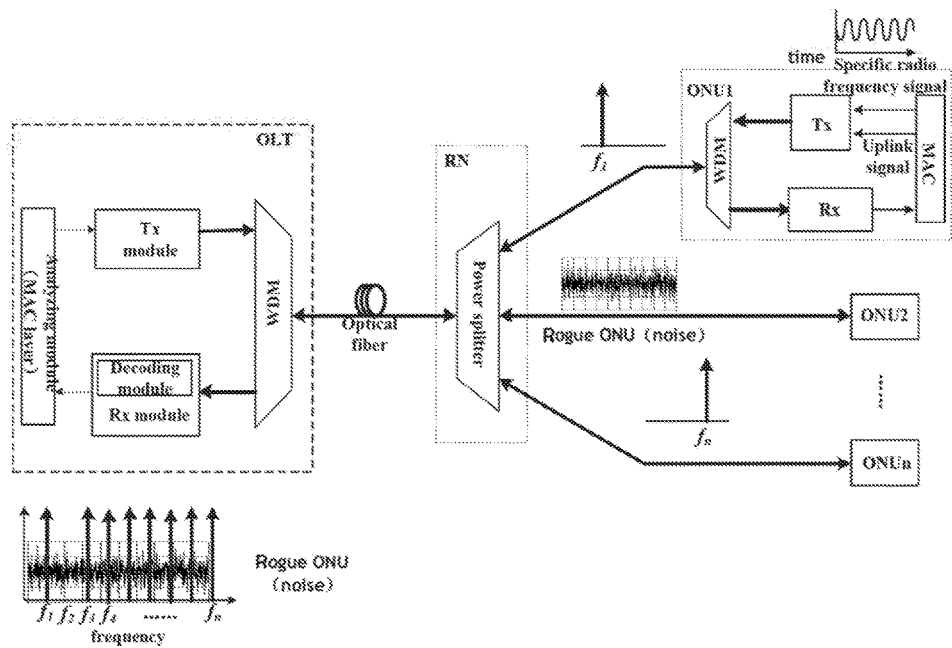
FIG. 2 illustrates a schematic structural diagram of identifying a long-shining rogue ONU according to the invention.

FIG. 2 illustrates a schematic structural diagram of identifying a long-shining rogue ONU according to the invention, where a general structure thereof is the same as the traditional PON system. In the invention, there is no modification to a Remote Node (RN), but there are some minor modifications to OLT and ONU modules.

Figure 3:
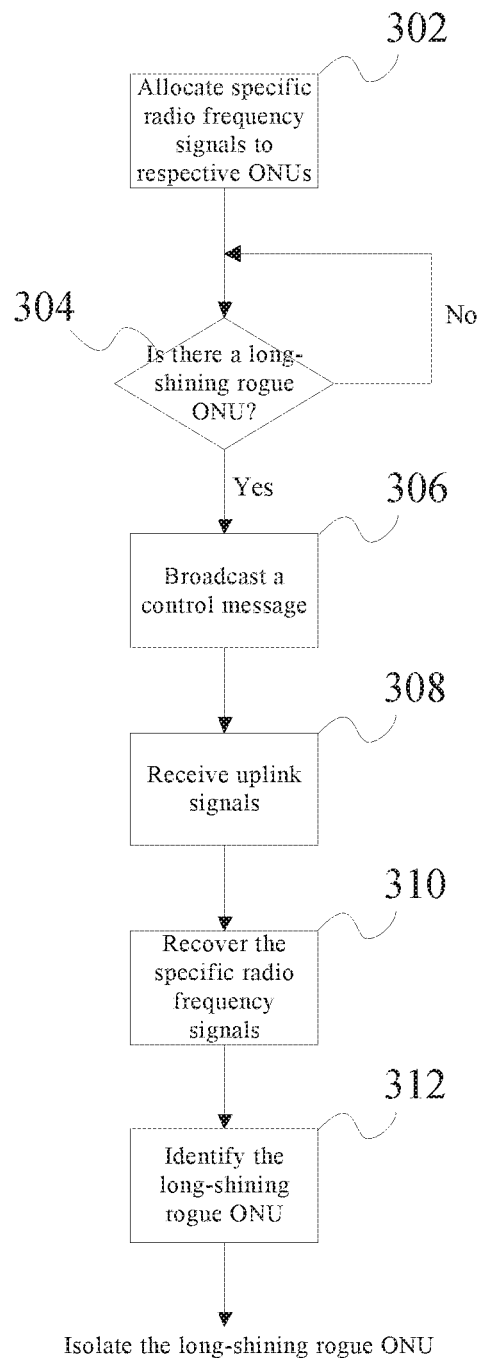
FIG. 3 illustrates a flow chart of a method, in an OLT in a passive optical network, of identifying a long-shining rogue ONU according to the invention.
Figure 4:
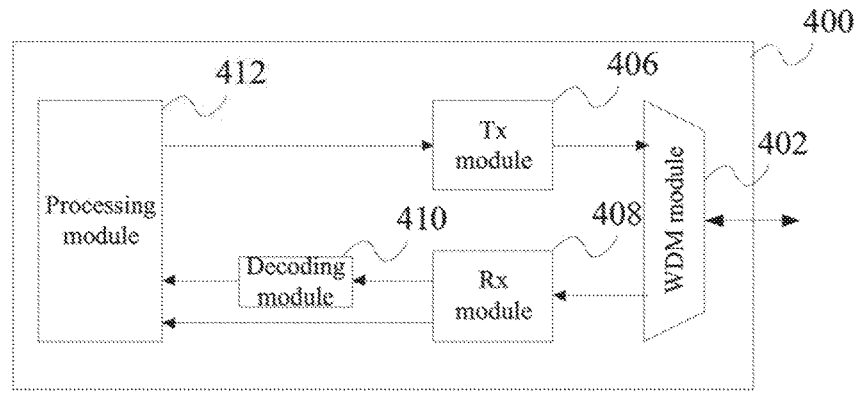
FIG. 4 illustrates a modular block diagram of an OLT device for identifying a long-shining rogue ONU in a passive optical network according to the invention.

FIG. 3 illustrates a flow chart of a method, in an OLT in a passive optical network, of identifying a long-shining rogue ONU according to the invention; and FIG. 4 illustrates a modular block diagram of an OLT device for identifying a long-shining rogue ONU in a passive optical network according to the invention. Steps in the method, in an OLT in a passive optical network, of identifying a long-shining rogue ONU according to the invention will be described below in details with reference to the flow chart of the method in FIG. 3 and the modular block diagrams in FIG. 4.

FIG. 4 illustrates modular elements of an OLT device 400 for identifying a long-shining rogue ONU in a passive optical network according to the invention, which includes:

A wavelength division multiplexing module 402 connected with an optical fiber network is configured to separate uplink and downlink wavelength division multiplexed signals from each other so that the downlink signals transmitted by a transmitting module 406 in the OLT device are transmitted into the optical fiber network through the wavelength division multiplexing module 402, and the uplink signals in the optical fiber network are transmitted into a receiving module 408 in the OLT device through the wavelength division multiplexing module 402.

A transmitting module 406 communicatively coupled with the wavelength division multiplexing module 402 is configured to transmit the downlink signals to ONUs in the passive optical network.

The receiving module 408 communicatively coupled with the wavelength division multiplexing module 402 is configured receive the uplink signals from the ONUs in the passive optical network.

A decoding module 410 communicatively coupled with the receiving module 408 is configured to recover specific radio frequency signals transmitted by normal ONUs from the uplink signals, where it shall be noted that the decoding module 410 can alternatively be built in the receiving module 408 as a part of the receiving module 408 as denoted by 208 in FIG. 2 or can alternatively be attached to the OLT device as an attached component (not illustrated) separate from the OLT device.

A processing module 412 communicatively coupled with the receiving module 408, the transmitting module 406 and the decoding module 410 is configured to identify an absent specific radio frequency signal according to the specific radio frequency signals recovered by the decoding module 410, and to determine a long-shining rogue ONU according to the absent specific radio frequency signal.

As illustrated in FIG. 3, the OLT device 400 allocates specific radio frequency signals to respective ONUs in the step 302.

Particularly the OLT allocates a specific radio frequency signal to each of the ONUs in the passive optical network, where the specific radio frequency signal is a sine wavelength signal on which no data is modulated, and there is a different frequency of the specific radio frequency signal allocated to each of the ONUs, for example, the specific radio frequency signal at the frequency f1 is allocated to the ONU1, the specific radio frequency signal at the frequency f2 is allocated to the ONU2, . . . , and the specific radio frequency signal at the frequency fn is allocated to the ONUn. Thus the different specific radio frequency signals correspond to the different ONUs, that is, a unique ONU can be identified by a specific radio frequency signal. The specific radio frequency signals can be encoded and can be inserted into an uplink data frame for transmission to the OLT in the uplink.

In a preferred embodiment, the specific radio frequency signals are low-frequency signals. Since the low-frequency signals are easier to generate and detect, the allocated specific radio frequency signals are the low-frequency signals in view of a cost of generating and detecting the signals.

In the step 304, the OLT device 400 detects whether there is a long-shining rogue ONU in the optical communication network.

Particularly the OLT detects such a long-shining rogue ONU in the passive optical network that transmits noise or a random signal so that the uplink signals of all the other normal ONUs can not be received correctly by the OLT, and the OLT proceeds to the step 306 when this situation is present in the passive optical network; otherwise, the OLT further operates normally and further detects a long-shining rogue ONU in the optical communication network after a predetermined period of time. In a preferred embodiment, the OLT starts to detect whether there is a long-shining rogue ONU in the optical communication network when the error bit ratio of an uplink signal received by the OLT is higher than a specific threshold.

In the step 306, the transmitting module 406 broadcasts a control message to each of the ONUs.

Particularly the transmitting module 406 broadcasts a Physical Layer Operation, Administration and Maintenance (PLOAM) control message to all the ONUs in the system, wherein the control message is a control command instructs all the ONUs to transmit their respective specific radio frequency signals in the uplink.

All of the normal ONUs will temporarily stop the original uplink data signals from being transmitted and transmit the allocated specific radio frequency signals to the OLT upon reception of the control message. When there is a long-shining rogue ONU, the long-shining rogue ONU transmits noise or a random signal interfering with data transmission of the normal ONUs so that the OLT can not receive correctly the uplink signals of the normal ONUs. Once the long-shining rogue ONU is identified and isolated, these normal ONUs will continue with transmission of the uplink data. Thus the specific radio frequency signals in the uplink will not occupy any bandwidth of the uplink signals.

On the other hand, the long-shining rogue ONU will further keep its laser in an operating status due to an MAC error or a transceiver failure, so it will not respond to the control message of the OLT but continue with transmission of the noise, the random signal or the other undesirable optical signals.

As illustrated in FIG. 2, the specific radio frequency signals transmitted by the normal ONUs and the noise or the random signal transmitted by the long-shining rogue ONU are superposed and transmitted into the OLT device over an optical fiber.

In the step 308, the receiving module 408 receives the uplink signals in the uplink.

Particularly the OLT will receive the uplink signals in the uplink through the receiving module 408 after transmitting the control message, where the uplink signals include the noise (or the random signal) transmitted by the long-shining rogue ONU and the specific radio frequency signals transmitted by the normal ONUs. The noise (or the random signal) and the specific radio frequency signals are superposed by the remote mode. The receiving module 408 will transmit the uplink signals to the decoding module 410 upon reception thereof so that the specific radio frequency signals transmitted by the respective normal ONUs are recovered from the uplink signals.

In the step 310, the decoding module 410 recovers the specific radio frequency signals.

Particularly the decoding module 410 can be embodied by an electronic spectrum analyzer performs Fourier transformation on the received uplink signals to thereby recover the specific radio frequency signals transmitted by the normal ONUs from the uplink signals with the noise or the random signal.

In the step 312, the processing module 412 identifies the long-shining rogue ONU.

Figure 5:
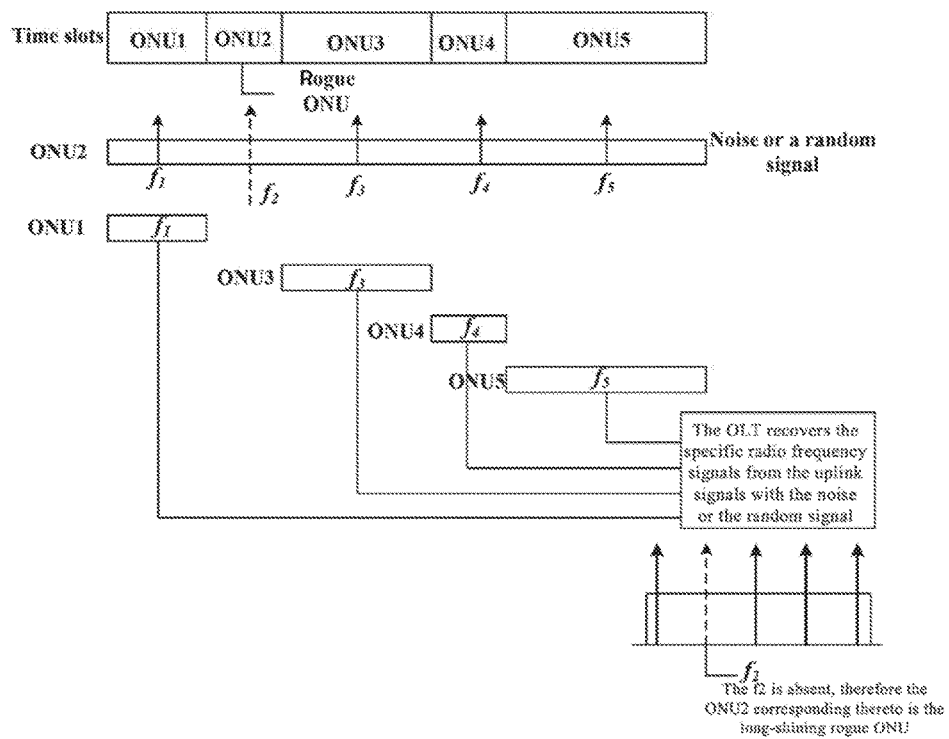
FIG. 5 illustrates a schematic diagram of a process of identifying a long-shining rogue ONU.

Particularly the processing module 412 identifies the absent specific radio frequency signal from the specific radio frequency signals, transmitted by the respective normal ONUs, recovered by the decoding module 410, where the ONU corresponding to the absent specific radio frequency signal is the long-shining rogue ONU. FIG. 5 illustrates a schematic diagram of a process of identifying a long-shining rogue ONU. In the example as illustrated in FIG. 5, there are five ONUs, which are an ONU1, an ONU2, . . . , and an ONU5, in the system, wherein the ONU2 is a long-shining rogue ONU transmitting a random signal constantly. A specific radio frequency signal at a specific frequency is allocated to each of the ONUs (the frequency of the specific radio frequency signal of the ONU1 is f1, . . . , and the frequency of the specific radio frequency signal of the ONU5 is f5). When the OLT transmits the control signal instructing all of the ONUs to transmit the specific radio frequency signals, all the other ONUs than the ONU2 transmit their respective specific radio frequency signals to the OLT. Thus the specific radio frequency signals corresponding to the respective normal ONUs, i.e., f1, f3, f4 and f5 can be recovered through Fourier transformation from the uplink signals parsed by the decoding module 410. The analysis module 412 can identify from the specific radio frequency signals recovered by the decoding module 410 the absence of the specific radio frequency signal at the frequency f2 in the received uplink signals, and thus can determine that the ONU2 has not transmitted its own specific radio frequency signal in response to the control message so that the ONU2 is the long-shining rogue ONU to be located.

The long-shining rogue ONU can be isolated manually or automatically after being identified successfully. Reference can be made to implementation instances in some references in the prior art for details thereof, and how to isolate a rogue ONU is not a focus of the invention, so a detailed description thereof will be omitted here.

Figure 6:
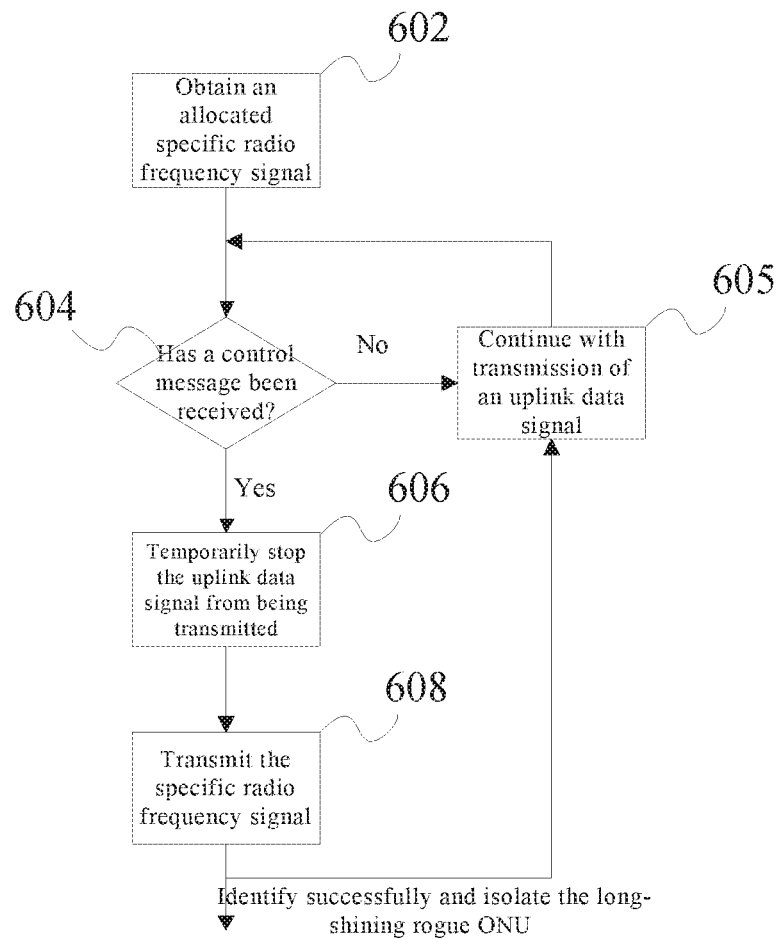
FIG. 6 illustrates a flow chart of a method, in an ONU in a passive optical network, of assisting an OLT in identifying a long-shining rogue ONU according to the invention.

FIG. 6 illustrates a flow chart of a method, in an ONU in a passive optical network, of assisting an OLT in identifying a long-shining rogue ONU according to the invention. Steps in the method, in an ONU in a passive optical network, of assisting an OLT in identifying a long-shining rogue ONU according to the invention will be described below with reference to the flow chart of the method in FIG. 6.

In the step 602, each ONU is provided with a specific radio frequency signal, where there is a different frequency of the specific radio frequency signal of each of the ONUs in the passive optical network, and the specific radio frequency signal is unique to each of the ONUs, so the respective ONUs can be identified by the specific radio frequency signals.

In a preferred embodiment, the specific radio frequency signals are low-frequency signals. Since the low-frequency signals are easier to generate and detect than high-frequency signals, the specific radio frequency signals are the low-frequency signals in view of saving a cost.

In the step 604, the ONU judges whether a control message broadcasted by the OLT has been received, where the control message is a control command instructing each of the ONUs to transmit the specific radio frequency signal in the uplink. The ONU proceeds to the step 605 where an uplink data signal is transmitted by original method in the uplink when the control message has not been received. The ONU proceeds to the step 606 upon reception of the control message.

In the step 606, the ONU temporarily stops the uplink data signal from being transmitted in the uplink to the OLT and proceeds to the step 608. When the control message transmitted by the OLT has been received, it indicates that there is a long-shining rogue ONU in the passive optical network so that the uplink data signal transmitted by the ONU can not be received correctly by the OLT, so it is necessary to temporarily stop the behavior of ongoing transmission of the uplink data signal so as to avoid an unnecessary waste of resources, and the ONU proceeds to the step 608 to assist the OLT in identifying and isolate the long-shining rogue ONU.

In the step 608, the ONU transmits the specific radio frequency signal allocated thereto to the OLT in the uplink to thereby indicate that the ONU can respond to the control message of the OLT and still be operating normally. In an embodiment according to the invention, the ONU encodes the specific radio frequency signal and inserts it into an uplink data frame for transmission to the OLT.

The ONU can continue transmission of uplink data in the uplink after the long-shining rogue ONU is identified by the OLT and isolated.

Those skilled in the art can appreciate that the invention apparently will not be limited to the foregoing exemplary embodiments abut can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method, in an OLT in a passive optical network, of identifying a long-shining rogue ONU among a plurality of ONUs, the long-shining rogue ONU transmitting noise or a random signal so that uplink signals of normal ONUs among the plurality of ONUs are not received normally, the method comprising:

allocating one of a plurality of specific radio frequency signals to each ONU among the plurality of ONUs in the passive optical network for responding to a control message instructing each ONU to transmit the allocated one of the plurality of specific radio frequency signals on the uplink, before the long-shining ONU is detected; and when the long-shining rogue ONU is detected in the passive optical network, performing each of broadcasting the control message to each ONU, receiving uplink signals on the uplink, recovering the allocated specific radio frequency signals transmitted by normal ONUs among the plurality of ONUs from the uplink signals, and identifying an absent allocated specific radio frequency signal based on the recovered specific radio frequency signals, wherein an ONU corresponding to the absent allocated specific radio frequency signal is the long-shining rogue ONU.

2. The method according to claim 1, wherein the recovering includes, performing Fourier transformation on the received uplink signals to thereby recover the specific radio frequency signals transmitted by the normal ONUs from the uplink signals.

3. The method according to claim 2, wherein the uplink signals include the noise or the random signal transmitted by the long-shining rogue ONU and the specific radio frequency signals transmitted by the normal ONUs.

4. The method according to claim 1, wherein the specific radio frequency signals are low-frequency signals.

5. The method according to claim 4, wherein the specific radio frequency signals are encoded and inserted into an uplink data frame.

6. A method, in an ONU in a passive optical network, of assisting an OLT in identifying a long-shining rogue ONU among a plurality of ONUs, the method comprising:

receiving an allocation of a specific radio frequency signal for responding to a control message broadcasted by the OLT to instruct each ONU among a plurality of ONUs to transmit the specific frequency signal on an uplink before receiving the control message;

receiving the control message;

stopping an uplink data signal from being transmitted to the OLT on the uplink; and transmitting the specific radio frequency signal to the OLT in the uplink.

7. The method according to claim 6, wherein the specific radio frequency signal is a low-frequency signal.

8. The method according to claim 6, wherein the method further comprises:

encoding the specific radio frequency signal and inserting the encoded specific radio frequency signal into an uplink data frame for transmission to the OLT.

9. An OLT apparatus for identifying a long-shining rogue ONU among a plurality of ONUs in a passive optical network, the OLT apparatus comprising:

a transmitting module configured to
- transmit downlink signals to each ONU among the plurality of ONUs in the passive optical network to allocate one of a plurality of specific radio frequency signals to each ONU among the plurality of ONUs in the passive optical network for responding to a control message instructing each ONU to transmit the allocated one of a plurality of specific radio frequency signals on the uplink, before the long-shining ONU is detected, and
- broadcast the control message to each ONU in response to detection of the long-shining rogue ONU;

a receiving module configured to receive uplink signals from the plurality of ONUs in the passive optical network, the uplink signals include noise or a random signal transmitted by the long-shining rogue ONU and at least one of the plurality of specific radio frequency signals transmitted by the normal ONUs among the plurality of ONUs;

a decoding module configured to recover the at least one of the plurality of specific radio frequency signals from the uplink signals; and a processing module configured to,
- detect the long-shining rogue ONU in the passive optical network, and
- identify an absent specific radio frequency signal according to the at least one of the plurality of specific radio frequency signals recovered by the decoding module, wherein an ONU corresponding to the absent specific radio frequency signal is the long-shining rogue ONU.

10. The OLT apparatus according to claim 9, wherein the decoding module is further configured to perform Fourier transformation on the received uplink signals to thereby recover the at least one of the plurality of specific radio frequency signals transmitted by the normal ONUs.

11. The OLT apparatus according to claim 9, wherein the plurality of specific radio frequency signals are low-frequency signals.

12. The OLT apparatus according to claim 11, wherein the specific radio frequency signals are encoded and inserted into an uplink data frame.

\* \* \* \* \*